(12) United States Patent
Wang et al.

(10) Patent No.: US 10,551,567 B2
(45) Date of Patent: Feb. 4, 2020

(54) BROADBAND POLARIZATION BEAM SPLITTER/COMBINER BASED ON GRADIENT WAVEGUIDE DIRECTIONAL COUPLER

(71) Applicant: WUHAN RESEARCH INSTITUTE OF POSTS AND TELECOMMUNICATIONS, Wuhan, Hubei (CN)

(72) Inventors: Lei Wang, Hubei (CN); Daigao Chen, Hubei (CN); Xi Xiao, Hubei (CN); Miaofeng Li, Hubei (CN); Ying Qiu, Hubei (CN)

(73) Assignee: WUHAN RESEARCH INSTITUTE OF POSTS AND TELECOMMUNICATIONS, Wuhan, Hubei (CN)

( * ) Notice: Subject to any disclaimer, the term of this patent is extended or adjusted under 35 U.S.C. 154(b) by 0 days.

(21) Appl. No.: 16/061,650

(22) PCT Filed: Dec. 7, 2016

(86) PCT No.: PCT/CN2016/108956
§ 371 (c)(1),
(2) Date: Jun. 12, 2018

(87) PCT Pub. No.: WO2017/101723
PCT Pub. Date: Jun. 22, 2017

(65) Prior Publication Data
US 2018/0372957 A1    Dec. 27, 2018

(30) Foreign Application Priority Data
Dec. 15, 2015 (CN) .......................... 2015 1 0929084

(51) Int. Cl.
*G02B 6/28* (2006.01)
*G02B 6/27* (2006.01)
(Continued)

(52) U.S. Cl.
CPC ............. *G02B 6/283* (2013.01); *G02B 6/125* (2013.01); *G02B 6/126* (2013.01); *G02B 6/1228* (2013.01);
(Continued)

(58) Field of Classification Search
None
See application file for complete search history.

(56) References Cited

U.S. PATENT DOCUMENTS 8,873,899 B2 * 10/2014 Anderson ................ G02B 6/27
385/11

* cited by examiner

*Primary Examiner* — Jerry Rahll
(74) *Attorney, Agent, or Firm* — Houtteman Law LLC

(57) ABSTRACT

A broadband polarization beam splitter/combiner based on a gradient waveguide directional coupler, comprises a gradient waveguide directional coupler, a beam combining end (1), a curved waveguide (5), a TE mode end (6) and a TM mode end (7). The coupler consists of a straight end gradient waveguide (2) and a serial end gradient waveguide (3). The trend of change of the gradient waveguide (2) is opposite to the gradient waveguide (3), and a gap is provided between the gradient waveguide (2) and the gradient waveguide (3). The beam combining end (1) is connected with one end of the gradient waveguide (2), the other end of the gradient waveguide (2) is connected with one end of the curved waveguide (5), the other end of the curved waveguide (5) is connected with the TE end (6), and the waveguide (3) is connected with the TM end (7).

9 Claims, 1 Drawing Sheet

(51) Int. Cl.
*G02B 6/125* (2006.01)
*G02B 6/126* (2006.01)
*G02B 6/122* (2006.01)
G02B 5/30 (2006.01)
H01P 5/18 (2006.01)

(52) U.S. Cl.
CPC ............ *G02B 6/27* (2013.01); *G02B 6/2726* (2013.01); *G02B 5/3058* (2013.01); *H01P 5/18* (2013.01)

us 10,551,567 B2

BROADBAND POLARIZATION BEAM SPLITTER/COMBINER BASED ON GRADIENT WAVEGUIDE DIRECTIONAL COUPLER

TECHNICAL FIELD

The present invention relates to the field of optical communication devices, specifically to a broadband polarization beam splitter/combiner based on gradient waveguide directional coupler.

BACKGROUND ART

As shown in FIG. 1, a polarization beam splitter is a device for splitting a light beam into a polarized light beam of TE mode (Transverse Electric mode) and a polarized light beam of TM mode (Transverse Magnetic mode), or a device for combining two polarized light beams into a light beam. The conventional beam splitter has the problem of narrow range of operating wavelength.

SUMMARY OF THE INVENTION

In order to overcome the problem of the prior art, an object of the present invention is to provide a broadband polarization beam splitter/combiner based on gradient waveguide directional coupler, which can reduce the sensitivity of a TM mode light field to the length of a coupling region and has a wider range of operating wavelength.

The present invention provides a broadband polarization beam splitter/combiner based on gradient waveguide directional coupler. The broadband polarization beam splitter/combiner comprises a gradient waveguide directional coupler, a beam combining end, a curved waveguide, a transverse electric mode TE end and a transverse magnetic mode TM end. The gradient waveguide directional coupler consists of a straight end gradient waveguide and a serial end gradient waveguide, the trend of change of the straight end gradient waveguide is opposite to that of the serial end gradient waveguide, and a gap is provided between the straight end gradient waveguide and the serial end gradient waveguide, the beam combining end is connected with one end of the straight end gradient waveguide, the other end of the straight end gradient waveguide is connected with one end of the curved waveguide, the other end of the curved waveguide is connected with the transverse electric mode TE end, and the serial end gradient waveguide is connected with the transverse magnetic mode TM end.

On the basis of the above technical solution, when the broadband polarization beam splitter/combiner is used as a beam splitter, a light is incident from the beam combining end, a light of TE mode exits from the transverse electric mode TE end, and a light of TM mode exits from the transverse magnetic mode TM end.

On the basis of the above technical solution, when the broadband polarization beam splitter/combiner is used as a beam combiner, a light of TE mode is incident from the transverse electric mode TE end, a light of TM mode is incident from the transverse magnetic mode TM end, and a light resulting from combining the two polarized light exits from the beam combining end.

On the basis of the above technical solution, the width of the straight end gradient waveguide is tapered, and the width of the serial end gradient waveguide is increased.

On the basis of the above technical solution, the width of the straight end gradient waveguide is tapered from [0.5, 1] µm to [0.3, 0.45] µm, the width of the serial end gradient waveguide is increased from [0.3, 0.45] µm to [0.5, 1] µm, and the gap is provided between the straight end gradient waveguide and the serial end gradient waveguide.

On the basis of the above technical solution, the width of the straight end gradient waveguide is tapered from [0.6, 0.9] µm to [0.35, 0.45] µm, the width of the serial end gradient waveguide is increased from [0.35, 0.45] µm to [0.6, 0.9] µm, and the gap is provided between the straight end gradient waveguide and the serial end gradient waveguide.

On the basis of the above technical solution, the width of the straight end gradient waveguide is increased, and the width of the serial end gradient waveguide is tapered.

On the basis of the above technical solution, the width of the straight end gradient waveguide is increased from [0.3, 0.45] µm to [0.5, 1] µm, the width of the serial end gradient waveguide is tapered from [0.5, 1] µm to [0.3, 0.45] µm, and the gap is provided between the straight end gradient waveguide and the serial end gradient waveguide.

On the basis of the above technical solution, the width of the straight end gradient waveguide is increased from [0.35, 0.45] µm to [0.6, 0.9] µm, the width of the serial end gradient waveguide is tapered from [0.6, 0.9] µm to [0.35, 0.45] µm, and the gap is provided between the straight end gradient waveguide and the serial end gradient waveguide.

As compared to the prior art, the present invention has the following advantages.

The broadband polarization beam splitter/combiner of the invention comprises a gradient waveguide directional coupler, a beam combining end, a curved waveguide, a transverse electric mode TE end and a transverse magnetic mode TM end. The gradient waveguide directional coupler consists of a straight end gradient waveguide and a serial end gradient waveguide, the trend of change of the straight end gradient waveguide is opposite to that of the serial end gradient waveguide, and a gap is provided between the straight end gradient waveguide and the serial end gradient waveguide. The beam combining end is connected with one end of the straight end gradient waveguide, the other end of the straight end gradient waveguide is connected with one end of the curved waveguide, the other end of the curved waveguide is connected with the transverse electric mode TE end, and the serial end gradient waveguide is connected with the transverse magnetic mode TM end. When the broadband polarization beam splitter/combiner is used as a beam splitter, a light is incident from the beam combining end, a light of TE mode exits from the transverse electric mode TE end, and a light of TM mode exits from the transverse magnetic mode TM end. When the broadband polarization beam splitter/combiner is used as a beam combiner, a light of TE mode is incident from the transverse electric mode TE end, a light of TM mode is incident from the transverse magnetic mode TM end, and a light resulting from combining the two polarized light exits from the beam combining end. Based on the difference in coupling efficiency of adjacent waveguides between the light of TE mode and the light of TM mode, the polarization beam splitter enables the output of TE from the straight waveguide and couples TM to the serial waveguide for output. The coupling efficiency of TE mode is not sensitive to the change in length of the coupling region of the straight waveguide and serial waveguide, while the TM mode of different wavelengths is sensitive to the coupling length. Therefore, the beam splitter has a wavelength dependency. By introducing a gradient waveguide structure, the broadband polarization beam splitter/combiner of the invention can reduce the sensitivity of the coupling efficiency of TM mode to the coupling length to reduce the wavelength dependency of the coupling efficiency of TM mode, and has a wider range of operating wavelength.

REFERENCE NUMBERS

1—beam combining end, 2—straight end gradient waveguide, 3—serial end gradient waveguide, 4—gap, 5—bending waveguide, 6—transverse electric mode TE end, 7—transverse magnetic mode TM end.

DETAILED DESCRIPTION OF THE INVENTION

The present invention will be further described in detail below with reference to the accompanying drawings and specific embodiments.

In order to widen the range of operating wavelength of the polarization beam splitter without increasing the complexity of the device, the embodiments of the present invention provides a broadband polarization beam splitter/combiner based on gradient waveguide directional coupler.

Figure 1:
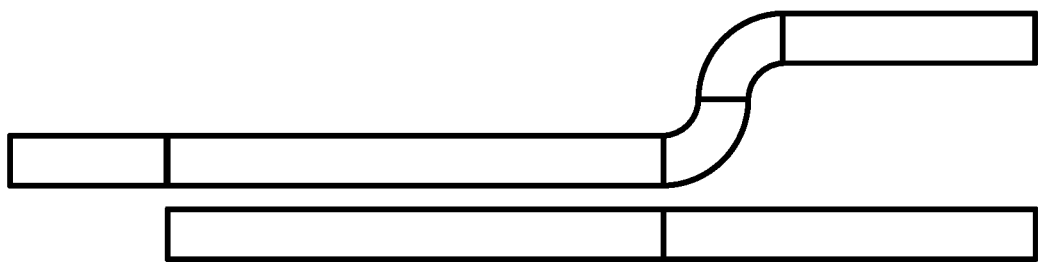
FIG. 1 schematically shows a structure of a conventional polarization beam splitter.
Figure 2:
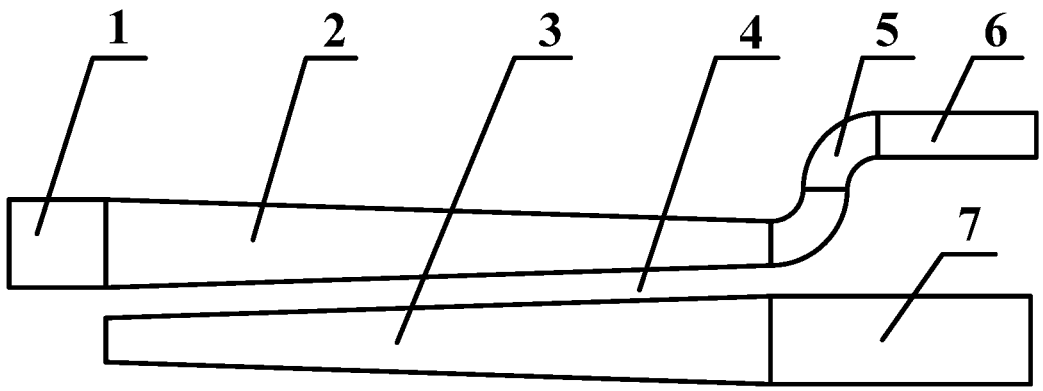
FIG. 2 schematically shows a structure of a broadband polarization beam splitter/combiner based on gradient waveguide directional coupler in accordance with example 1 of the invention.
Figure 3:
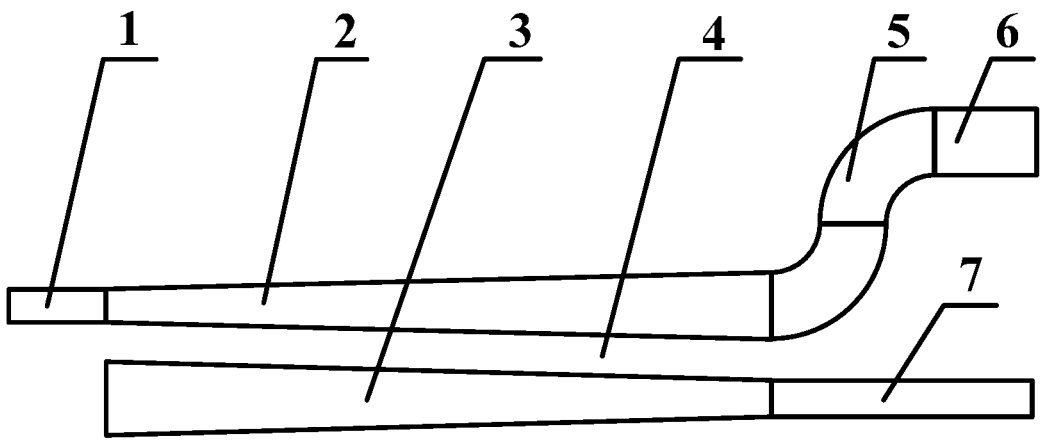
FIG. 3 schematically shows a structure of a broadband polarization beam splitter/combiner based on gradient waveguide directional coupler in accordance with example 2 of the invention.

As shown in FIG. 2 and FIG. 3, the broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3, the trend of change of the straight end gradient waveguide 2 is opposite to that of the serial end gradient waveguide 3, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

In particular, the width of the straight end gradient waveguide 2 is tapered from [0.5, 1] μm to [0.3, 0.45] μm, the width of the serial end gradient waveguide 3 is increased from [0.3, 0.45] μm to [0.5, 1] μm, and a gap is provided between the straight end gradient waveguide 2 and the serial end gradient waveguide 3.

Alternatively, the width of the straight end gradient waveguide 2 is increased from [0.3, 0.45] μm to [0.5, 1] μm, the width of the serial end gradient waveguide 3 is tapered from [0.5, 1] μm to [0.3, 0.45] μm, and the gap is provided between the straight end gradient waveguide 2 and the serial end gradient waveguide 3.

Further, the width of the straight end gradient waveguide 2 is tapered from [0.6, 0.9] μm to [0.35, 0.45] μm, the width of the serial end gradient waveguide 3 is increased from [0.35, 0.45] μm to [0.6, 0.9] μm, and the gap is provided between the straight end gradient waveguide 2 and the serial end gradient waveguide 3.

Alternatively, the width of the straight end gradient waveguide 2 is increased from [0.35, 0.45] μm to [0.6, 0.9] μm, the width of the serial end gradient waveguide 3 is tapered from [0.6, 0.9] μm to [0.35, 0.45] μm, and the gap is provided between the straight end gradient waveguide 2 and the serial end gradient waveguide 3.

The following is a detailed description in correction with 12 specific examples.

Example 1

As shown in FIG. 2, Example 1 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 0.5 μm to 0.3 μm, the width of the serial end gradient waveguide 3 is increased from 0.3 μm to 0.5 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 2

As shown in FIG. 3, Example 2 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.3 μm to 0.5 μm, the width of the serial end gradient waveguide 3 is tapered from 0.5 μm to 0.3 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 3

As shown in FIG. 2, Example 3 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 0.6 μm to 0.35 μm, the width of the serial end gradient waveguide 3 is increased from 0.35 μm to 0.6 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 4

As shown in FIG. 3, Example 4 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.35 μm to 0.6 μm, the width of the serial end gradient waveguide 3 is tapered from 0.6 μm to 0.35 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 5

As shown in FIG. 2, Example 5 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 0.7 μm to 0.4 μm, the width of the serial end gradient waveguide 3 is increased from 0.4 μm to 0.7 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 6

As shown in FIG. 3, Example 6 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.4 μm to 0.7 μm, the width of the serial end gradient waveguide 3 is tapered from 0.7 μm to 0.4 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 7

As shown in FIG. 2, Example 7 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 0.8 μm to 0.4 μm, the width of the serial end gradient waveguide 3 is increased from 0.4 μm to 0.8 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 8

As shown in FIG. 3, Example 8 provides a broadband polarization beam splitter/combiner based on gradient wave-guide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.4 μm to 0.8 μm, the width of the serial end gradient waveguide 3 is tapered from 0.8 μm to 0.4 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 9

As shown in FIG. 2, Example 9 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 0.9 μm to 0.45 μm, the width of the serial end gradient waveguide 3 is increased from 0.45 μm to 0.9 μm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 10

As shown in FIG. 3, Example 10 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.45 µm to 0.9 µm, the width of the serial end gradient waveguide 3 is tapered from 0.9 µm to 0.45 µm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 11

As shown in FIG. 2, Example 11 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is tapered from 1 µm to 0.45 µm, the width of the serial end gradient waveguide 3 is increased from 0.45 µm to 1 µm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

Example 12

As shown in FIG. 3, Example 12 provides a broadband polarization beam splitter/combiner based on gradient waveguide directional coupler. The broadband polarization beam splitter/combiner of the invention comprises a gradient waveguide directional coupler, a beam combining end 1, a curved waveguide 5, a transverse electric mode TE end 6 and a transverse magnetic mode TM end 7. The gradient waveguide directional coupler consists of a straight end gradient waveguide 2 and a serial end gradient waveguide 3. The width of the straight end gradient waveguide 2 is increased from 0.45 µm to 1 µm, the width of the serial end gradient waveguide 3 is tapered from 1 µm to 0.45 µm, and a gap 4 is provided between the straight end gradient waveguide 2 and the serial end gradient waveguide 3. The beam combining end 1 is connected with one end of the straight end gradient waveguide 2, the other end of the straight end gradient waveguide 2 is connected with one end of the curved waveguide 5, the other end of the curved waveguide 5 is connected with the transverse electric mode TE end 6, and the serial end gradient waveguide 3 is connected with the transverse magnetic mode TM end 7.

When the broadband polarization beam splitter/combiner is used as a beam splitter, a light is incident from the beam combining end 1, a light of TE mode exits from the transverse electric mode TE end 6, and a light of TM mode exits from the transverse magnetic mode TM end 7.

When the broadband polarization beam splitter/combiner is used as a beam combiner, a light of TE mode is incident from the transverse electric mode TE end 6, a light of TM mode is incident from the transverse magnetic mode TM end 7, and a light resulting from combining the two polarized light exits from the beam combining end 1.

The invention claimed is:
1. A broadband polarization beam splitter/combiner based on gradient waveguide directional coupler, configured to split a light into a light of a transverse electric mode TE mode and a light of a transverse magnetic mode TM mode, or to combine a light of a transverse electric mode TE mode and a light of a transverse magnetic mode TM mode into a light, consists of a gradient waveguide directional coupler, a beam combining end (1), a curved waveguide (5), a transverse electric mode TE end (6) and a transverse magnetic mode TM end (7), the gradient waveguide directional coupler consists of a straight end gradient waveguide (2) and a serial end gradient waveguide (3), the trend of change of the straight end gradient waveguide (2) is opposite to that of the serial end gradient waveguide (3), and a gap (4) is provided between the straight end gradient waveguide (2) and the serial end gradient waveguide (3), the beam combining end (1) is connected with one end of the straight end gradient waveguide (2), the other end of the straight end gradient waveguide (2) is connected with one end of the curved waveguide (5), the other end of the curved waveguide (5) is connected with the transverse electric mode TE end (6), and the serial end gradient waveguide (3) is connected with the transverse magnetic mode TM end (7).

2. The broadband polarization beam splitter/combiner of claim 1, wherein when the broadband polarization beam splitter/combiner is used as a beam splitter, a light is incident from the beam combining end (1), a light of TE mode exits from the transverse electric mode TE end (6), and a light of TM mode exits from the transverse magnetic mode TM end (7).

3. The broadband polarization beam splitter/combiner of claim 1, wherein when the broadband polarization beam splitter/combiner is used as a beam combiner, a light of TE mode is incident from the transverse electric mode TE end (6), a light of TM mode is incident from the transverse magnetic mode TM end (7), and a light resulting from combining the two polarized light exits from the beam combining end (1).

4. The broadband polarization beam splitter/combiner of claim 1, wherein the width of the straight end gradient waveguide (2) is tapered, and the width of the serial end gradient waveguide (3) is increased.

5. The broadband polarization beam splitter/combiner of claim 4, wherein the width of the straight end gradient waveguide (2) is tapered from [0.5, 1] μm to [0.3, 0.45] μm, the width of the serial end gradient waveguide (3) is increased from [0.3, 0.45] μm to [0.5, 1] μm, and the gap is provided between the straight end gradient waveguide (2) and the serial end gradient waveguide (3).

6. The broadband polarization beam of claim 5, wherein the width of the straight end gradient waveguide (2) is tapered from [0.6, 0.9] μm to [0.35, 0.45] μm, the width of the serial end gradient waveguide (3) is increased from [0.35, 0.45] μm to [0.6, 0.9] μm, and the gap is provided between the straight end gradient waveguide (2) and the serial end gradient waveguide (3).

7. The broadband polarization beam of claim 1, wherein the width of the straight end gradient waveguide (2) is increased, and the width of the serial end gradient waveguide (3) is tapered.

8. The broadband polarization beam of claim 7, wherein the width of the straight end gradient waveguide (2) is increased from [0.3, 0.45] μm to [0.5, 1] μm, the width of the serial end gradient waveguide (3) is tapered from [0.5, 1] μm to [0.3, 0.45] and the gap is provided between the straight end gradient waveguide (2) and the serial end gradient waveguide (3).

9. The broadband polarization beam of claim 8, wherein the width of the straight end gradient waveguide (2) is increased from [0.35, 0.45] μm to [0.6, 0.9] μm, the width of the serial end gradient waveguide (3) is tapered from [0.6, 0.9] μm to [0.35, 0.45] μm, and the gap is provided between the straight end gradient waveguide (2) and the serial end gradient waveguide (3).

\* \* \* \* \*